(12) United States Patent
Eom et al.

(10) Patent No.: US 11,482,702 B2
(45) Date of Patent: Oct. 25, 2022

(54) POSITIVE ELECTRODE ACTIVE MATERIAL, PREPARATION METHOD THEREOF, POSITIVE ELECTRODE INCLUDING SAME AND SECONDARY BATTERY

(71) Applicant: LG Chem, Ltd., Seoul (KR)

(72) Inventors: Jun Ho Eom, Daejeon (KR); Sung Ho Ban, Daejeon (KR); Hyeon Hui Baek, Daejeon (KR); Na Ri Park, Daejeon (KR)

(73) Assignee: LG Chem, Ltd.

( * ) Notice: Subject to any disclaimer, the term of this patent is extended or adjusted under 35 U.S.C. 154(b) by 305 days.

(21) Appl. No.: 16/638,321

(22) PCT Filed: Feb. 26, 2019

(86) PCT No.: PCT/KR2019/002335
§ 371 (c)(1),
(2) Date: Feb. 11, 2020

(87) PCT Pub. No.: WO2019/172568
PCT Pub. Date: Sep. 12, 2019

(65) Prior Publication Data
US 2020/0227743 A1 Jul. 16, 2020

(30) Foreign Application Priority Data
Mar. 9, 2018 (KR) .................. 10-2018-0027888

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0404* (2013.01); *H01M 4/131* (2013.01);
(Continued)

(58) Field of Classification Search
CPC .... H01M 4/525; H01M 4/0404; H01M 4/131; H01M 4/364; H01M 4/505; H01M 4/668;
(Continued)

(56) References Cited

U.S. PATENT DOCUMENTS

2004/0161668 A1* 8/2004 Maeda ................... C01G 53/42
429/223
2007/0231691 A1 10/2007 Abe et al.
(Continued)

FOREIGN PATENT DOCUMENTS

| CN | 101355149 A | 1/2009 |
| CN | 102013470 A | 4/2011 |

(Continued)

OTHER PUBLICATIONS

Search Report for Chinese Application No. 201980003878.1 dated Nov. 24, 2021. 3 pgs.

(Continued)

*Primary Examiner* — Matthew J Merkling
(74) *Attorney, Agent, or Firm* — Lerner, David, Littenberg, Krumholz & Mentlik, LLP

(57) ABSTRACT

A method for preparing a positive electrode active material and a positive electrode active material prepared by the method are provided. The method includes preparing a lithium composite transition metal oxide represented by Formula 1, and washing the lithium composite transition metal oxide with a cleaning liquid containing cleaning water and a surfactant. The cleaning liquid contains cleaning water in an amount of no less than 50 parts by weight and less than 400 parts by weight based on 100 parts by weight of the lithium composite transition metal oxide.

18 Claims, 2 Drawing Sheets

(51) Int. Cl.
*H01M 4/131* (2010.01)
*H01M 4/36* (2006.01)
*H01M 4/505* (2010.01)
*H01M 4/66* (2006.01)
*H01M 10/0525* (2010.01)
*H01M 50/46* (2021.01)
*H01M 4/02* (2006.01)

(52) U.S. Cl.
CPC ............ *H01M 4/364* (2013.01); *H01M 4/505* (2013.01); *H01M 4/668* (2013.01); *H01M 10/0525* (2013.01); *H01M 50/46* (2021.01); *H01M 2004/021* (2013.01); *H01M 2004/027* (2013.01); *H01M 2004/028* (2013.01)

(58) Field of Classification Search
CPC ............ H01M 50/46; H01M 10/0525; H01M 2004/021; H01M 2004/027; H01M 2004/028
See application file for complete search history.

(56) References Cited

U.S. PATENT DOCUMENTS

| | | | |
|---|---|---|---|
| 2010/0068624 A1 | 3/2010 | Hiratsuka et al. | |
| 2010/0136412 A1 | 6/2010 | Watanabe | |
| 2011/0200880 A1* | 8/2011 | Yu | H01M 4/525 429/223 |
| 2012/0034516 A1 | 2/2012 | Koo et al. | |
| 2012/0231341 A1* | 9/2012 | Kim | C01G 53/42 977/773 |
| 2012/0292561 A1 | 11/2012 | Sasaoka et al. | |
| 2014/0050656 A1* | 2/2014 | Kang | H01M 4/505 423/594.6 |
| 2015/0147655 A1* | 5/2015 | Park | H01M 4/582 429/231.1 |
| 2015/0349336 A1 | 12/2015 | Yokoyama | |
| 2015/0372300 A1 | 12/2015 | Imaizumi et al. | |
| 2016/0013476 A1 | 1/2016 | Oh et al. | |
| 2017/0110726 A1 | 4/2017 | Aida et al. | |
| 2018/0034050 A1 | 2/2018 | Son et al. | |
| 2018/0040890 A1 | 2/2018 | Choi et al. | |
| 2019/0190009 A1* | 6/2019 | Noh | H01M 4/131 |
| 2019/0221844 A1* | 7/2019 | Kim | H01M 4/505 |
| 2019/0288284 A1 | 9/2019 | Otterstedt | |
| 2019/0341610 A1 | 11/2019 | Aida et al. | |
| 2020/0067089 A1 | 2/2020 | Shinpuku et al. | |

FOREIGN PATENT DOCUMENTS

| | | | | |
|---|---|---|---|---|
| CN | 103253717 A | 8/2013 | | |
| CN | 104781960 A | 7/2015 | | |
| CN | 105633384 A | 6/2016 | | |
| CN | 105914356 A | 8/2016 | | |
| CN | 104766960 B | 1/2017 | | |
| EP | 3790026 A1 * | 3/2021 | ............... | C01B 6/21 |
| EP | 3902037 A1 * | 10/2021 | | |
| JP | H07282803 A | 10/1995 | | |
| JP | 2009289726 A | 12/2009 | | |
| JP | 2012119093 A | 6/2012 | | |
| JP | 5040075 B2 | 10/2012 | | |
| JP | 2016006762 A | 1/2016 | | |
| JP | 2017130414 A | 7/2017 | | |
| JP | 2018020949 A | 2/2018 | | |
| JP | 2018037372 A | 3/2018 | | |
| JP | 2020516016 A | 5/2020 | | |
| KR | 20060035350 A | 4/2006 | | |
| KR | 20090080973 A | 7/2009 | | |
| KR | 20150042610 A | 4/2015 | | |
| KR | 20160066227 A | 6/2016 | | |
| KR | 20160086228 A | 7/2016 | | |
| KR | 101651336 B1 | 8/2016 | | |
| KR | 20160138048 A | 12/2016 | | |
| KR | 101815998 B1 | 1/2018 | | |
| KR | 20180012527 A | 2/2018 | | |
| WO | 2010053328 A2 | 5/2010 | | |
| WO | 2011089958 A1 | 7/2011 | | |
| WO | 2016104305 A1 | 6/2016 | | |
| WO | 2018016525 A1 | 1/2018 | | |

OTHER PUBLICATIONS

International Search Report for PCT/KR2019/002335 dated May 28, 2019.
European Search Report for Application No. EP19764055, dated Oct. 15, 2020. 5 pages.

* cited by examiner

POSITIVE ELECTRODE ACTIVE MATERIAL, PREPARATION METHOD THEREOF, POSITIVE ELECTRODE INCLUDING SAME AND SECONDARY BATTERY

CROSS-REFERENCE TO RELATED APPLICATIONS

The present application is a national stage entry under 35 U.S.C. § 371 of PCT/KR2019/002335 filed on Feb. 26, 2019, which claims priority to Korean Patent Application No. 10-2018-0027888, filed on Mar. 9, 2018, in the Korean Intellectual Property Office, the disclosures of which are incorporated herein in their entirety by reference.

TECHNICAL FIELD

Technical Field

The present invention relates to a positive electrode active material, a preparation method thereof, and a positive electrode including the same and a secondary battery, and more particularly, to a method for preparing a positive electrode active material for a secondary battery and a positive electrode active material prepared thereby, the method minimizing the generation of defects of a positive electrode active material due to cleaning and improving surface properties to ensure a uniform surface coating.

Background Art

Recently, with the popularization of mobile devices and electric power tools, and the increasing demand for environmentally friendly electric vehicles, the conditions for energy sources that drive these devices, tools and vehicles are gradually increasing. In particular, the development of a positive electrode active material having a stable driving and long lifespan properties under a high energy density and a high voltage is required.

As a positive electrode active material of a lithium secondary battery, a lithium transition metal composite oxide is used. Among such lithium transition metal composite oxides, a lithium cobalt oxide, such as $LiCoO_2$, which has a high functional voltage and excellent capacity properties has been mainly used. However, $LiCoO_2$ has very poor thermal properties due to the instability of crystal structure according to deintercalated lithium, and also, is expensive. Therefore, it is limited to use a large amount of $LiCoO_2$ as a power source for an electric vehicle or the like.

As a material to replace $LiCoO_2$, a lithium manganese composite metal oxide ($LiMnO_2$, $LiMn_2O_4$, or the like), a lithium iron phosphate compound ($LiFePO_4$ or the like), or a lithium nickel composite metal oxide ($LiNiO_2$ and the like) has been developed. However, when compared with $LiCoO_2$, $LiNiO_2$ has poor thermal stability, and when an internal short circuit occurs due to external pressure or the like in a charged state, a positive electrode active material itself is decomposed, causing the rupture and ignition of a battery.

Therefore, as a method for improving the thermal stability of $LiNiO_2$ which is low while maintaining the excellent reversible capacity thereof, a nickel cobalt manganese-based lithium composite transition metal oxide in which a part of Ni is substituted with Mn and Co (hereinafter, simply referred to as 'NCM-based lithium oxide') has been developed. However, conventional NCM-based lithium oxides developed up to the present have no sufficient capacity so that there has been a limitation in the application thereof.

In order to overcome such limitations, in recent years, studies have been conducted to increase the content of Ni in an NCM-based lithium oxide to improve the capacity properties of a positive electrode active material. In general, in the case of a lithium complex transition metal oxide having a nickel atomic fraction of 0.6 or greater in the transition metal, a large amount of lithium by-products such as LiOH and $Li_2CO_3$ remain on the surface of the lithium composite transition metal oxide in a manufacturing process, and the lithium by-products react with an electrolyte or the like during the operation of a battery causing the generation of gas, swelling, and the like. Therefore, typically, in order to use a lithium composite transition metal oxide containing a high concentration of nickel as a positive cathode active material, a washing process for removing lithium by-products on the surface of the lithium complex transition metal oxide has been essentially required.

Meanwhile, typically, it has been common to mix cleaning water to be more than 10 times the weight of an NCM-based lithium oxide during the washing. When the proportion of the cleaning water satisfies the above range, unreacted lithium by-products on the surface of the lithium oxide may be sufficiently removed. However, when cleaning water is used in an excessive amount as described above, defects are generated on the surface of a positive electrode active material after cleaning, causing the deterioration in battery lifespan properties. Also, in order to improve the lifespan properties or stability of a positive electrode active material, there is a case in that a coating process is performed on the surface of the positive electrode active material. However, when the positive electrode active material is cleaned by a typical cleaning method, it is difficult to form a uniform coating layer after the cleaning due to the energy difference between the surface of the positive electrode active material and the surface of a coating material.

DISCLOSURE OF THE INVENTION

Technical Problem

An aspect of the present invention provides a method for preparing a positive electrode active material for a secondary battery, the method minimizing the generation of defects of a positive electrode active material due to cleaning and improving surface properties to ensure a uniform surface coating.

Technical Solution

According to an aspect of the present invention, there is provided a method for preparing a positive electrode active material and a positive electrode active material prepared thereby, the method including preparing a lithium composite transition metal oxide represented by Formula 1 below, and washing the lithium composite transition metal oxide with a cleaning liquid containing cleaning water and a surfactant, wherein the cleaning liquid contains the cleaning water in an amount of no less than 50 parts by weight and less than 400 parts by weight based on 100 parts by weight of the lithium composite transition metal oxide.

  [Formula 1]

(In Formula 1, $M^1$ is one or more selected from the group consisting of Mn and Al, $M^2$ is one or more selected from the group consisting of Zr, B, W, Mg, Ce, Hf, Ta, Ti, Sr, Ba, F, P, S, and La, and $0.9 \leq a \leq 1.1$, $0.6 \leq b < 1$, $0 < c \leq 0.3$, $0 < d \leq 0.3$, $0 \leq e \leq 0.1$.)

According to another aspect of the present invention, there is provided a positive electrode active material including a lithium composite transition metal oxide represented by Formula 1 below, wherein the powder electrical conductivity measured after pressing the lithium composite transition metal oxide with a force of 20 kN is 0.05 S/cm or less.

$$Li_a[Ni_bCo_cM^1_dM^2_e]O_2 \quad \text{[Formula 1]}$$

(In Formula 1, $M^1$ is one or more selected from the group consisting of Mn and Al, $M^2$ is one or more selected from the group consisting of Zr, B, W, Mg, Ce, Hf, Ta, La, Ti, Sr, Ba, F, P, S, and La, and $0.9 \leq a \leq 1.1$, $0.6 \leq b < 1$, $0 < c \leq 0.3$, $0 < d \leq 0.3$, $0 \leq e \leq 0.1$.)

According to yet another aspect of the present invention, there is provided a positive electrode and a secondary battery both including the positive electrode active material.

Advantageous Effects

The method for preparing a positive electrode active material according to the present invention makes it possible to obtain a sufficient cleaning effect with only a small amount of cleaning water by adding a surfactant to a cleaning liquid. Accordingly, it is possible to suppress the generation of defects on the surface of a positive electrode active material which occurs when an excessive amount of cleaning liquid is used.

Also, according to the method of the present invention, the surface properties of a positive active material are modified during a cleaning process by a surfactant included in a cleaning liquid, so that when a coating process is performed after the cleaning process, adhesion to a coating material is increased, thereby forming an uniform coating layer.

BEST MODE FOR CARRYING OUT THE INVENTION

Figure 1:
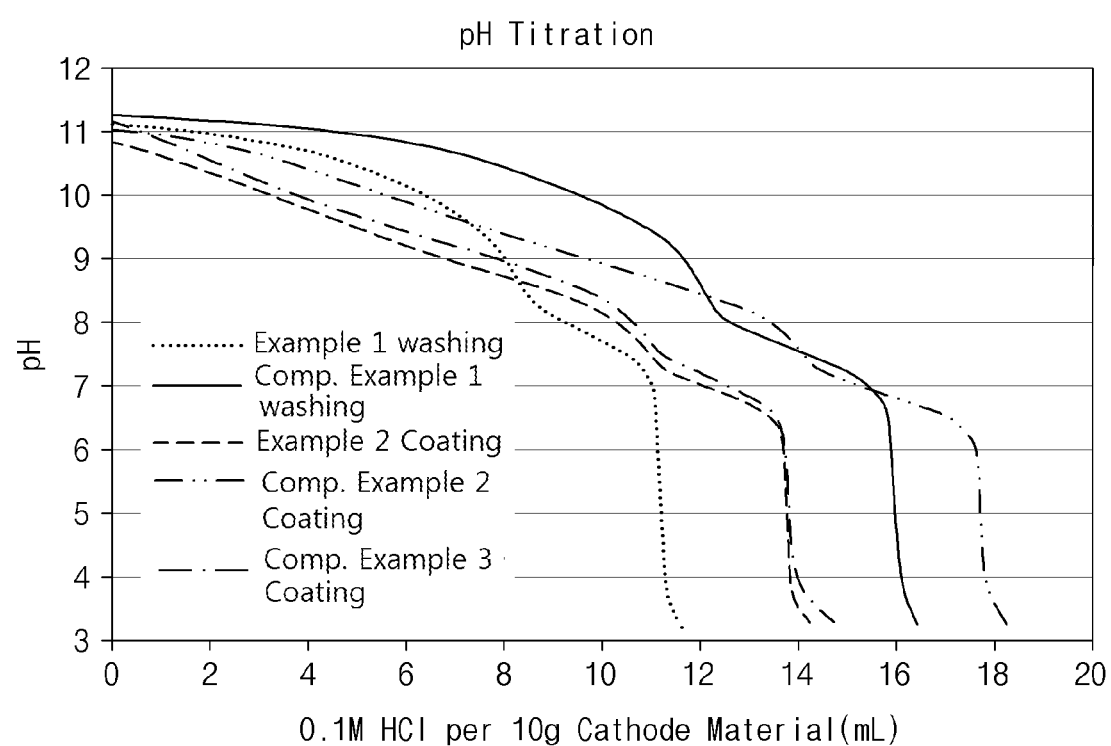
FIG. 1 is a pH titration curve showing the contents of lithium by-products of a positive electrode active material prepared by each of Examples 1-2 and Comparative Examples 1-3.

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

The method for preparing a positive electrode active material according to the present invention includes (1) preparing a lithium composite transition metal oxide represented by Formula 1 below, and (2) washing the lithium composite transition metal oxide with a cleaning liquid containing cleaning water and a surfactant.

In addition, the method for preparing a positive electrode active material according to the present invention may further include, if necessary, (3) forming a coating layer on the surface of the lithium composite transition metal oxide after the washing.

Hereinafter, each step of the present invention will be described in more detail.

(1) Preparing Lithium Composite Transition Metal Oxide

First, a lithium composite transition metal oxide is prepared.

The lithium composite transition metal oxide used in the present invention is a lithium composite transition metal oxide including nickel and cobalt as transition metals in which an atomic fraction of nickel in the total transition metals is 0.6 or greater.

Specifically, the lithium composite transition metal oxide may be a lithium composite transition metal oxide represented by Formula 1 below.

$$Li_a[Ni_bCo_cM^1_dM^2_e]O_2$$

(In Formula 1, $M^1$ is one or more selected from the group consisting of Mn and Al, $M^2$ is one or more selected from the group consisting of Zr, B, W, Mg, Ce, Hf, Ta, La, Ti, Sr, Ba, F, P, S, and La, and $0.9 \leq a \leq 1.1$, $0.6 \leq b < 1$, $0 < c \leq 0.3$, $0 < d \leq 0.3$, $0 \leq e \leq 0.1$.)

Specifically, a represents the atomic ratio of lithium in the lithium composite transition metal oxide, and a is 0.9 to 1.1.

b represents the atomic ratio of nickel in the lithium composite transition metal oxide, and b may be 0.6 to less than 1, preferably 0.65 to less than 1, more preferably 0.65 to 0.95.

c represents the atomic ratio of cobalt in the lithium composite transition metal oxide, and c may be greater than 0 to 0.3, preferably 0.001 to 0.25, more preferably 0.01 to 0.25.

d represents the atomic ratio of the $M^1$ element in the lithium composite transition metal oxide, and d may be greater than 0 to 0.3, preferably 0.001 to 0.25, more preferably 0.01 to 0.25.

e represents the atomic ratio of the $M^2$ element in the lithium composite transition metal oxide, and e may be 0 to 0.1, preferably 0 to 0.05.

Specific examples of the lithium composite transition metal oxide may be $Li[Ni_bCo_cMn_d]O_2$, $Li[Ni_bCo_cMn_dM^2_e]O_2$, $Li[Ni_bCo_cAl_d]O_2$, $Li[Ni_bCo_cAl_dM^2_e]O_2$, $Li[Ni_bCo_cMn_{d1}Al_{d2}M^2_e]O_2$ (in the above formulas, a, b, c, d and e are the same as defined in Formula 1, and $0 < d1 \leq 0.3$ and $0 < d2 \leq 0.3$), and the like, but are not limited thereto.

The lithium composite transition metal oxide of [Formula 1] above may be, for example, prepared by mixing a transition metal precursor and a lithium-containing raw material, followed by firing.

The transition metal precursor includes nickel and cobalt, and may be a hydroxide, an oxyhydroxide, a carbonate, and an organic complex of a composite transition metal optionally including $M^1$ and/or $M^2$.

The transition metal precursor may be a commercially available product purchased and used, or may be prepared according to a method for preparing a transition metal precursor that is well known in the art.

For example, the transition metal precursor may be prepared by adding a metal solution containing a nickel-containing raw material and a cobalt-containing raw material with an ammonium cation-containing complex formation agent and a basic compound followed by a co-precipitation reaction. If necessary, the metal solution may additionally include an $M^1$-containing raw material and/or an $M^2$-containing raw material.

The nickel-containing raw material may be, for example, an acetate, a nitrate, a sulfate, a halide, a sulfide, a hydroxide, an oxide, or an oxyhydroxide, and the like, all containing nickel, specifically $Ni(OH)_2$, $NiO$, $NiOOH$, $NiCO_3.2Ni(OH)_2.4H_2O$, $NiC_2O_2.2H_2O$, $Ni(NO_3)_2.6H_2O$, $NiSO_4$, $NiSO_4.6H_2O$, a fatty acid nickel salt, a nickel halide, or a combination thereof, but is not limited thereto.

The cobalt-containing raw material may be, for example, an acetate, a nitrate, a sulfate, a halide, a sulfide, a hydroxide, an oxide, or an oxyhydroxide, and the like, all containing cobalt, specifically $Co(OH)_2$, $CoOOH$, $Co(OCOCH_3)_2.4H_2O$, $Co(NO_3)_2.6H_2O$, $Co(SO_4)_2.7H_2O$, or a combination thereof, but is not limited thereto.

In the $M^1$-containing raw material, $M^1$ may be one or more of aluminum and manganese, and the $M^1$-containing raw material may be an acetate, a nitrate, a sulfate, a halide, a sulfide, a hydroxide, an oxide, or an oxyhydroxide, and the like, all containing an $M^1$ element. Specifically, the $M^1$-containing raw material may be a manganese oxide such as $Mn_2O_3$, $MnO_2$, and $Mn_3O_4$; a manganese salt such as $MnCO_3$, $Mn(NO_3)_2$, $MnSO_4$, a manganese acetate, a manganese dicarboxylate, a manganese citrate, and a manganese fatty acid; a manganese oxyhydroxide, a manganese chloride; $Al_2O_3$, $Al_2(SO_4)_3$, $AlCl_3$, Al-isopropoxide, $Al(NO_3)_3$, or a combination thereof, but is not limited thereto.

In the $M^2$-containing raw material, an $M^2$ element may be one or selected from the group consisting of Zr, B, W, Mg, Ce, Hf, Ta, La, Ti, Sr, Ba, F, P, S, and La, and the $M^2$-containing raw material may be an acetate, a nitrate, a sulfate, a halide, a sulfide, a hydroxide, an oxide, or an oxyhydroxide, and the like, all containing the $M^2$ element.

The metal solution may be prepared by adding a nickel-containing raw material, a cobalt-containing raw material, and selectively an $M^1$-containing raw material and/or an $M^2$-containing raw material to a solvent, specifically water, or a mixed solvent of water and an organic solvent (for example, alcohol, etc.) which can be uniformly mixed with water. Alternatively, the metal solution may be prepared by mixing an aqueous solution of a nickel-containing raw material, an aqueous solution of a cobalt-containing raw material, an aqueous solution of an $M^1$-containing raw material, and an aqueous solution of an $M^2$-containing raw material.

The ammonium cation-containing complex formation agent may be, for example, $NH_4OH$, $(NH_4)_2SO_4$, $NH_4NO_3$, $NH_4C_1$, $CH_3COONH_4$, $(NH_4)_2CO_3$, or a combination thereof, but is not limited thereto. Meanwhile, the ammonium cation-containing complex formation agent may be used in the form of an aqueous solution. At this time, as a solvent, water, or a mixture of an organic solvent (for example, alcohol, etc.) which may be uniformly mixed with water and water may be used.

The basic compound may be a hydroxide of an alkali metal or an alkaline earth metal such as NaOH, KOH or $Ca(OH)_2$, a hydrate thereof, or a combination thereof. The basic compound may also be used in the form of an aqueous solution. At this time, as a solvent, water, or a mixture of an organic solvent (for example, alcohol, etc.) which may be uniformly mixed with water and water may be used.

The basic compound is added to control the pH of a reaction solution, and may be added in an amount such that the pH of the metal solution becomes 10.5 to 13, preferably 11 to 13.

Meanwhile, the co-precipitation reaction may be performed in an inert atmosphere, such as in a nitrogen atmosphere or in an argon atmosphere and the like, at a temperature of 40° C. to 70° C. In addition, in order to increase the reaction rate during the reaction, a stirring process may be selectively performed. At this time, the stirring rate may be 100 rpm to 2000 rpm.

Transition metal precursor particles are generated by the above process and precipitated in a reaction solution. The precipitated transition metal precursor particles are separated according to a typical method and dried to obtain a transition metal precursor.

The lithium-containing raw material may be a carbonate (for example, lithium carbonate and the like), a hydrate (for example, lithium hydroxide hydrate ($LiOH.H_2O$) and the like), a hydroxide (for example, lithium hydroxide and the like), a nitrate (such as lithium nitrate ($LiNO_3$) and the like) and a chloride (such as lithium chloride (LiCl) and the like), and the like, all containing lithium, and any one thereof or a mixture of two or more thereof may be used.

Meanwhile, the mixing of a positive electrode active material precursor and a lithium-containing raw material may be performed by solid state mixing such as jet milling, and the mixing ratio of the positive electrode active material precursor and the lithium-containing raw material may be determined to be in a range satisfying the atomic ratio of each component in a positive electrode active material precursor to be finally prepared.

Meanwhile, although not required, during the mixing, additional raw materials to dope a portion of a transition metal of the positive electrode active material may be further included. For example, during the mixing, the $M^1$-containing raw material and/or the $M^2$-containing raw material may be additionally mixed.

Meanwhile, the firing may be performed at 600° C. to 1000° C., preferably 700° C. to 900° C., and may be performed for 5-30 hours, preferably 8-15 hours, but the temperature and the duration of the firing are not limited thereto.

(2) Washing

Next, the lithium composite transition metal oxide is washed with a cleaning liquid containing cleaning water and a surfactant. Specifically, the washing may be performed by injecting a lithium composite transition metal oxide into the cleaning liquid followed by stirring.

The cleaning water is to dissolve and remove lithium by-products on the surface of the lithium composite transition metal oxide, and may be, for example, ultrapure water, water, and the like, but is not limited thereto.

It is preferable that the cleaning water is used in a content of 0.5 times to less than 4 times the weight of a lithium composite transition metal oxide injected. That is, it is preferable that the cleaning water is included in an amount of no less than 50 parts by weight and less than 400 parts by weight based on 100 parts by weight of the lithium composite transition metal oxide. When the amount of cleaning water to be used is at least 4 times the weight of a lithium composite transition metal oxide, defects may be generated on the surface of a positive electrode active material during a washing process, and when the amount is less than 0.5 times, lithium by-products are not sufficiently removed. More preferably, the cleaning water may be included in an amount of 50 parts by weight to 300 parts by weight, yet more preferably 50 parts by weight to 150 parts by weight based on the 100 parts by weight of the lithium composite transition metal oxide.

Meanwhile, the surfactant is to improve the cleaning efficiency, and to modify the surface properties of a lithium composite transition metal oxide, and may be one or more selected from the group consisting of an anionic surfactant, a cationic surfactant, and an amphoteric surfactant.

Specific examples of the anionic surfactant may be alkylsulfuric acid ester salt, alkylbenzenesulfonic acid salt, and the like, and specific example of the cationic surfactant may be alkyltrimethyl ammonium chloride, stearitrimethyl ammonium chloride, and the like, but are not limited thereto. Specific examples of the amphoteric surfactant may be alkaldimethyl aminochosan betaine, sodium β-lauuril aminopropyon, and the like, but are not limited thereto.

Meanwhile, the surfactant may be used in a content of 0.01-10 parts by weight, preferably 0.1-5 parts by weight, more preferably 0.1-3 parts by weight based on 100 parts by weight of a lithium composite transition metal oxide to be injected. When the content of the surfactant is less than 0.01 parts by weight, the improvement of cleaning efficiency and the surface modification effect are insignificant. When greater than 10 parts by weight, even the surface of a positive electrode active material is removed during washing, thereby generating surface defects, which may lead to a problem of lifespan deterioration.

When washing is performed by adding a surfactant in a cleaning liquid as in the present invention, lithium by-products may be effectively removed even with a small amount of cleaning water, and the surface of a lithium composite transition metal oxide is modified by the surfactant, so that when a coating process is performed after the washing process, adhesion to a coating material is increased, thereby forming an uniform coating layer.

Meanwhile, the temperature for the washing may be 5° C. to 25° C., and the duration of the washing may be 5 to 30 minutes or 10 minutes to 3 hours. When the temperature and duration of the washing satisfy the above ranges, lithium by-products may be effectively removed.

When the washing step is completed, the washed lithium composite transition metal oxide is dried at 110-250° C. for 30 minutes to 5 hours to obtain a positive electrode active material.

(3) Forming Coating Layer

The preparation method according to the present invention may additionally perform a step of forming a coating layer on a lithium composite transition metal oxide if necessary, after the washing is completed.

At this time, the forming of a coating layer may be performed by, for example, mixing the lithium composite transition metal oxide and a coating raw material and then performing heat treatment.

At this time, the coating raw material may be an oxide, a hydroxide, an oxyhydroxide, a carbonate, a sulfate, a halide, a sulfide, an acetate, or a carboxylate, or a combination thereof each including one or more elements (hereinafter, referred to as a 'coating element') selected from the group consisting of Al, Ti, W, B, F, P, Mg, Ni, Co, Fe, Cr, V, Cu, Ca, Zn, Zr, Nb. Mo, Sr, Sb, Bi, Si, and S, but is not limited thereto.

Specifically, the coating raw material may be ZnO, $Al_2O_3$, $Al(OH)_3$, $AlSO_4$, $AlCl_3$, Al-isopropoxide), $AlNO_3$, $TiO_2$, $WO_3$, AlF, $H_2BO_3$, $HBO_2$, $H_3BO_3$, $H_2B_4O_7$, $B_2O_3$, $C_6H_5B(OH)_2$, $(C_6H_5O)_3B$, $[(CH_3(CH_2)_3O)_3B$, $C_3H_9B_3O_6$, $(C_3H_7O_3)B$, $Li_3WO_4$, $(NH_4)_{10}W_{12}O_{41}\cdot 5H_2O$, $NH_4H_2PO_4$, and the like, but is not limited thereto.

The formation of the coating layer may be performed by a method known in the art. For example, a wet coating method, a dry coating method, a plasma coating method, Atomic Ayer Deposition (ALD) or the like may be used.

Also, the heat treatment may be performed at 100° C. to 800° C., preferably 250° C. to 500° C. for 1-15 hours, preferably 3-10 hours.

When a coating layer formation process is performed after typical washing, the difference between the surface energy of a positive electrode active material and the surface energy of a coating material is great after the washing, so that the cohesion among coating materials is greater than the adhesion between the coating material and the positive electrode active material. Therefore, it is difficult for the coating material to be uniformly applied on the surface of the positive electrode active material. However, a lithium composite transition metal oxide of the present invention has the surface thereof modified by a surfactant in a cleaning process, thereby having surface energy similar to that of a coating material. Accordingly, the adhesion between the lithium composite transition metal oxide and the coating material is increased, so that a coating film may be uniformly formed.

Positive Electrode Active Material

Next, a positive electrode active material according to the present invention will be described.

The positive electrode active material according to the present invention is a positive electrode active material prepared according to the preparation method of the present invention.

According to the preparation method of the present invention described above, liquid water and a surfactant are used together so that lithium by-products may be effectively removed even with a small amount of a cleaning liquid, and the generation of defects on the surface of the lithium composite transition metal oxide due to the cleaning water may be minimized. Accordingly, the positive electrode active material according to the present invention prepared by the above method is characterized by having a low content of lithium by-products and less surface defects. Specifically, the positive electrode active material according to the present invention has a content of lithium by-products of 0.6 wt % or less, preferably 0.1-0.6 wt %.

Also, according to the preparation method of the present invention, the surface of a lithium composite transition metal oxide is modified by a surfactant during a cleaning process, so that a lower powder electrical conductivity is achieved compared with a typical positive electrode active material washed with only water. Specifically, the powder electrical conductivity measured after pressing a positive electrode active material prepared by the method of the present invention with a force of 20 kN is 0.05 S/cm or less, preferably 0.045 S/cm or less, more preferably 0.03 S/cm or less. Meanwhile, when the force applied during pressing is small, the powder electrical conductivity appears even lower. For example, the powder electrical conductivity measured after pressing a positive electrode active material prepared by the method of the present invention with a force of 4 kN is 0.02 S/cm or less, preferably 0.015 S/cm or less, more preferably 0.01 S/cm or less.

When a lithium composite transition metal oxide has a low powder electrical conductivity as described above, adhesion to a coating material is improved, so that a uniform coating layer may be formed.

Specifically, a positive electrode active material of the present invention may include a lithium composite transition metal oxide represented by Formula 1 below.

$$Li_a[Ni_bCo_cM^1_dM^2_e]O_2 \quad \text{[Formula 1]}$$

(In Formula 1, $M^1$ is one or more selected from the group consisting of Mn and Al, $M^2$ is one or more selected from the group consisting of Zr, B, W, Mg, Ce, Hf, Ta, La, Ti, Sr, Ba, F, P, S, and La, and $0.9 \leq a \leq 1.1$, $0.6 \leq b < 1$, $0 < c \leq 0.3$, $0 < d \leq 0.3$, $0 \leq e \leq 0.1$.)

Specifically, a represents the atomic ratio of lithium in the lithium composite transition metal oxide, and a is 0.9 to 1.1.

b represents the atomic ratio of nickel in the lithium composite transition metal oxide, and b may be 0.6 to less than 1, preferably 0.65 to less than 1, more preferably 0.65 to 0.95.

c represents the atomic ratio of cobalt in the lithium composite transition metal oxide, and c may be greater than 0 to 0.3, preferably 0.001 to 0.25, more preferably 0.01 to 0.25.

d represents the atomic ratio of the $M^1$ element in the lithium composite transition metal oxide, and d may be greater than 0 to 0.3, preferably 0.001 to 0.25, more preferably 0.01 to 0.25.

e represents the atomic ratio of the $M^2$ element in the lithium composite transition metal oxide, and e may be 0 to 0.1, preferably 0 to 0.05.

A positive electrode active material according to the present invention may further include a coating layer on the lithium composite transition metal oxide. At this time, the coating layer may include one or more elements selected from the group consisting of Al, Ti, W, B, F, P, Mg, Ni, Co, Fe, Cr, V, Cu, Ca, Zn, Zr, Nb, Mo, Sr, Sb, Bi, Si, and S. When the coating layer as described above is formed on a lithium composite transition metal oxide, side reactions with an electrolyte may be reduced and the structural stability of a positive electrode active material may be further improved.

Positive Electrode and Secondary Battery

The positive electrode active material according to the present invention may be usefully used in manufacturing a positive electrode for a secondary battery.

Specifically, a positive electrode according to the present invention includes the positive electrode active material according to the present invention. More specifically, the positive electrode includes a positive electrode current collector and a positive electrode active material layer formed on the positive electrode current collector. At this time, the positive electrode active material layer may include a positive electrode active material according to the present invention. Detailed contents of the positive electrode active material according to the present invention are the same as those described above, and thus, a detailed description thereof will be omitted.

The positive electrode may be manufactured according to a typical method for manufacturing a positive electrode except that the positive electrode active material according to the present invention is used. For example, the positive electrode may be manufactured by manufacturing a positive electrode mixture by dissolving or dispersing components constituting a positive electrode active material layer, which are a positive electrode active material, a conductive material and/or a binder, in a solvent, applying the mixture on at least one surface of a positive electrode current collector, followed by drying and then pressing. Alternatively, the positive electrode may be manufactured by casting the positive electrode mixture on a separate support, and then laminating a film obtained by being peeled off from the support on the positive electrode current collector.

At this time, the positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of a positive electrode active material. For example, the positive electrode current collector may be used in various forms such as a film, a sheet, a foil, a net, a porous body, a foam, and a non-woven body.

On at least one surface of the current collector, a positive electrode active material layer including the positive electrode active material according to the present invention, and if necessary, further including at least one of a conductive material or a binder optionally is disposed.

The positive electrode active material may be included in an amount of 80-99 wt %, more specifically 85-98 wt % based on the total weight of the positive electrode active material layer. When included in the above content range, excellent capacity properties may be exhibited.

The conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1 wt % to 30 wt % based on the total weight of a positive electrode active material layer.

In addition, the binder serves to improve the bonding between positive electrode active material particles and the adhesion between a positive electrode active material and a current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of a positive electrode active material layer.

Meanwhile, a solvent used in preparing a positive electrode mixture may be a solvent commonly used in the art. For example, dimethyl sulfoxide (DMSO), isopropyl alcohol, N-methylpyrrolidone (NMP), acetone, water, and the like may be used alone, or a mixture thereof may be used. The amount of the solvent to be used may be appropriately adjusted in consideration of the applying thickness of a slurry, preparation yield, viscosity, and the like.

Next, a secondary battery according to the present invention will be described.

The secondary battery according to the present invention includes a positive electrode, a negative electrode disposed to face the positive electrode, a separator interposed between the positive electrode and the negative electrode, and an electrolyte. At this time, the positive electrode is the positive electrode according to the present invention described above.

Meanwhile, the secondary battery may further include a battery case for accommodating an electrode assembly composed of the positive electrode, the negative electrode, and the separator, and a sealing member for sealing the battery case, optionally.

In the secondary battery, the negative electrode includes a negative electrode current collector and a negative electrode active material layer disposed on at least one surface of the negative electrode current collector.

The negative electrode may be manufactured according to a typical manufacturing method of a negative electrode known in the art. For example, the negative electrode may be manufactured by manufacturing a negative electrode mixture by dissolving or dispersing components constituting a negative electrode active material layer, which are a negative electrode active material, a conductive material and/or a binder, in a solvent, applying the mixture on at least one surface of a negative electrode current collector, followed by drying and then pressing.

The negative electrode current collector is not particularly limited as long as it has high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode collector may typically have a thickness of 3 μm to 500 μm, and as in the case of a positive electrode current collector, microscopic irregularities may be formed on the surface of the negative electrode current collector to improve the adhesion of the negative electrode active material. For example, the negative electrode current collector may be used in various forms such as a film, a sheet, a foil, a net, a porous body, a foam, a non-woven body, and the like.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a (semi)metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_x(0<v<2)$, $SnO_2$, a vanadium oxide, and a lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may include soft carbon and hard carbon, and typical examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch-derived cokes.

Also, the binder and the conductive material may be the same as those described above in the description of the positive electrode.

Meanwhile, in the secondary battery, the separator is to separate the negative electrode and the positive electrode and to provide a movement path for lithium ions. Any separator may be used without particular limitation as long as it is typically used as a separator in a secondary battery. Particularly, a separator having high moisture-retention ability for an electrolyte as well as low resistance to the movement of electrolyte ions is preferable. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Furthermore, a coated separator including a ceramic component or a polymer material may be used to secure heat resistance or mechanical strength, and may be used in a single-layered or a multi-layered structure, selectively.

Meanwhile, the electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the manufacturing of a secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used as the organic solvent. Among these solvents, a carbonate-based solvent is preferable, and a mixture of a cyclic carbonate (e.g., ethylene carbonate or propylene carbonate) having high ionic conductivity and high dielectric constant and a linear carbonate-based compound having low viscosity (e.g., ethylmethyl carbonate, dimethyl carbonate, or diethyl carbonate), the mixture which may increase charging/discharging performance of a battery, is more preferable. In this case, when the cyclic carbonate and the chain carbonate are mixed in a volume ratio of about 1:1 to about 1:9, the performance of the electrolyte may be excellent.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the reduction in battery capacity, and improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexamethyl phosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may further be included in addition to the above electrolyte components. At this time, the additive may be included in an amount of 0.1 wt % to 5 wt % based on the total weight of an electrolyte.

The lithium secondary battery according to the present invention such as described above may be usefully used in portable devices such as a mobile phone, a notebook computer, and a digital camera, and in electric cars such as a hybrid electric vehicle (HEV).

In addition, the secondary battery according to the present invention may be used as a unit cell of a battery module, and the battery module may be applied to a battery pack. The battery module or the battery pack may be used as a power source of at least one medium-and-large sized device such as a power tool; electric cars including an electric vehicle (EV), a hybrid electric vehicle (HEV), and a plug-in hybrid electric vehicle (PHEV); or a power storage system.

MODE FOR CARRYING OUT THE INVENTION

Hereinafter, examples of the present invention will be described in detail so that those skilled in the art can easily carry out the present invention. The present invention may, however, be embodied in many different forms and is not limited to the examples set forth herein.

EXAMPLE 1

$Ni_{0.9}Co_{0.08}Mn_{0.02}(OH)_2$ and $LiOH.H_2O$ were uniformly mixed in a molar ratio of 1:1.05, and the mixture was fired at 740° C. for 12 hours to prepare a lithium composite transition metal oxide $LiNi_{0.9}Co_{0.08}Mn_{0.02}O_2$ ($D_{50}$=10 μm).

140 g of the lithium composite transition metal oxide and 0.7 g of a surfactant (a product containing 17.5 wt % of a mixture of sodium alkyl ether sulfate, sodium olefin sulfonate, and dimethyldodesil polyoxyethylene glycol amine oxide) were added to 140 g of water, and the mixture was stirred and then washed for 15 minutes. Thereafter, the washed mixture was dried at 150° C. to obtain a positive electrode active material A.

EXAMPLE 2

The positive electrode active material A prepared in Example 1 was mixed with $H_3BO_3$, and the mixture was heat treated at 300° C. for 3 hours to obtain a positive electrode active material B having a coating layer including a B element.

COMPARATIVE EXAMPLE 1

$Ni_{0.9}Co_{0.08}Mn_{0.02}(OH)_2$ and $LiOH.H_2O$ were uniformly mixed in a molar ratio of 1:1.05, and the mixture was fired at 740° C. for 12 hours to prepare a lithium composite transition metal oxide $LiNi_{0.9}Co_{0.08}Mn_{0.02}O_2$ ($D_{50}$=10 μm).

140 g of the lithium composite transition metal oxide was added to 140 g of water, and the mixture was stirred and then washed for 15 minutes. Thereafter, the washed mixture was dried at 150° C. to obtain a positive electrode active material C.

COMPARATIVE EXAMPLE 2

The positive electrode active material C prepared in Comparative Example 1 was mixed with $H_3BO_3$, and the mixture was heat treated at 300° C. for 3 hours to obtain a positive electrode active material D having a coating layer including the B element.

COMPARATIVE EXAMPLE 3

$Ni_{0.9}Co_{0.08}Mn_{0.02}(OH)_2$ and $LiOH.H_2O$ were uniformly mixed in a molar ratio of 1:1.05, and the mixture was fired at 740° C. for 12 hours to prepare a lithium composite transition metal oxide $LiNi_{0.9}Co_{0.08}Mn_{0.02}O_2$(D50=10 μm).

140 g of the lithium composite transition metal oxide was added to 560 g of water, and the mixture was stirred and then washed for 15 minutes. Thereafter, the washed mixture was dried at 150° C. to obtain a positive electrode active material E.

The prepared positive electrode active material E was mixed with $H_3BO_3$, and the mixture was heat treated at 300° C. for 3 hours to obtain a positive electrode active material F having a coating layer including the B element.

EXPERIMENTAL EXAMPLE 1

Evaluation of Lithium By-Products Content

The positive electrode active materials prepared in each of Examples 1 and 2 and Comparative Examples 1 to 2 were dissolved in water, and then titrated with a hydrochloric acid to measure the content of lithium by-products included in positive electrode active materials. The measurement results are shown in FIG. 1.

As shown in FIG. 1, in the case of the positive electrode active materials prepared in each of Examples 1 and 2, it was confirmed that the amount of hydrochloric acid required for the titration was less than that of the positive electrode active materials prepared in each of Comparative Examples 1 to 3, which indicates a lower content of lithium by-products.

The contents of lithium by-products in the positive electrode active materials calculated on the basis of FIG. 1 are as described in [Table 1].

TABLE 1

|  | Content of lithium by-products (wt %) |
| --- | --- |
| Example 1 | 0.343 |
| Example 2 | 0.403 |

TABLE 1-continued

| | Content of lithium by-products (wt %) |
|---|---|
| Comparative Example 1 | 0.474 |
| Comparative Example 2 | 0.523 |
| Comparative Example 3 | 0.407 |

EXPERIMENTAL EXAMPLE 2

Evaluation of Powder Electrical Conductivity 10 g of the positive electrode active materials prepared in each of Example 1 and Comparative Example 1 were put into a holder and pressed by applying a force of 4 kN and 20 kN, respectively. Thereafter, 4-probes ring electrodes for powder (Mitsubishi Chemical Co., powder resistivity system MCP-PD51) was used to measure the powder electrical conductivity thereof. The measurement results are shown in Table 2 below.

TABLE 2

| LOAD (kN) | Example 1 (S/cm) | Comparative Example 1 (S/cm) |
|---|---|---|
| 4 | 0.0070 | 0.0318 |
| 20 | 0.0216 | 0.0885 |

As shown in Table 2, in the case of the positive electrode active material prepared in Examples 1, the powder electrical conductivity thereof measured after being pressed with a force of 4 kN and 20 kN was significantly lower than that of the positive electrode active material prepared in Comparative Example 1. Particularly, in the case of the positive electrode active material of Example 1, even when the pressing pressure was high, the degree of increase in the powder electrical conductivity was significantly less than that of the positive electrode active material of Comparative Example 1. When the powder electrical conductivity is low, it is possible to form a uniform coating layer since the adhesion to a coating material is high.

EXPERIMENTAL EXAMPLE 3

Evaluation of Lifespan Properties

Each of the positive electrode active materials prepared in Example 2 and Comparative Examples 2 and 3, a carbon black conductive material, and a PVdF binder were mixed in an N-methylpyrrolidone solvent at a weight ratio of 95:2.5:2.5 to prepare a positive electrode mixture material (viscosity: 5000 mPa·s), and the mixture material was applied on one surface of an aluminum current collector, dried at 130° C., and then pressed to manufacture a positive electrode. Thereafter, the positive electrode was used to manufacture coin half-cell batteries.

Thereafter, the coin half-cell batteries were charged and discharged for 30 cycles under the conditions of a charge final voltage of 4.25 V and a discharge final voltage of 2.5 V at 0.3 C/0.3 C and 45° C. The measurement results are shown in FIG. 2.

Figure 2:
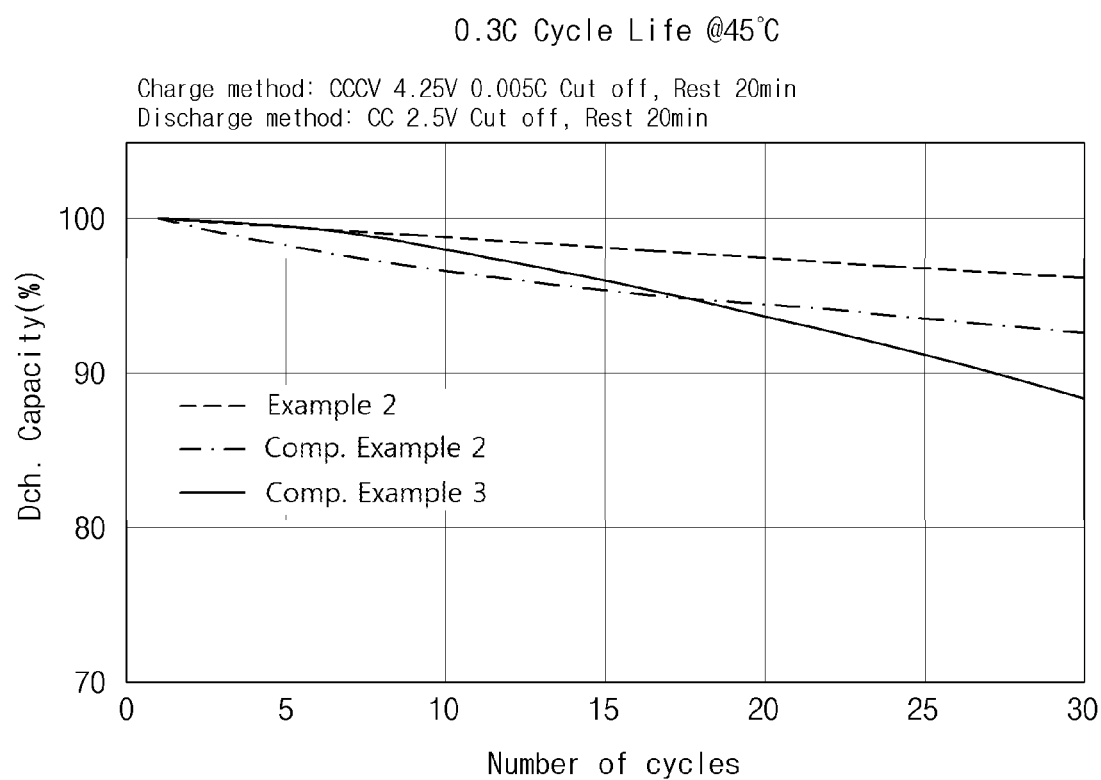
FIG. 2 is a graph showing the discharge capacity properties according to the number of cycles of a battery cell manufactured using a positive electrode active material prepared by each of Example 2 and Comparative Examples 2 and 3.

Referring to FIG. 2, it can be confirmed that the lifespan properties of a battery applied with the positive electrode active material of Example 2 are significantly excellent compared to those of the batteries of Comparative Examples 2 and 3.

The invention claimed is:

1. A method for preparing a positive electrode active material comprising:
    preparing a lithium composite transition metal oxide represented by Formula 1 below; and
    washing the lithium composite transition metal oxide with a cleaning liquid comprising cleaning water and a surfactant, $$Li_a[Ni_bCo_cM^1_dM^2_e]O_2 \quad \text{[Formula 1]}$$

(wherein, $M^1$ is one or more selected from the group consisting of Mn and Al, $M^2$ is one or more selected from the group consisting of Zr, B, W, Mg, Ce, Hf, Ta, Ti, Sr, Ba, F, P, S, and La, and $0.9 \le a \le 1.1$, $0.6 \le b < 1$, $0 < c \le 0.3$, $0 < d \le 0.3$, $0 \le e \le 0.1$; and
    wherein the cleaning liquid contains the cleaning water in an amount of no less than 50 parts by weight and less than 400 parts by weight based on 100 parts by weight of the lithium composite transition metal oxide.

2. The method of claim 1, wherein the cleaning liquid contains the surfactant in an amount of 0.01-10 parts by weight based on 100 parts by weight of the lithium composite transition metal oxide.

3. The method of claim 1, wherein the surfactant is one or more selected from the group consisting of an anionic surfactant, a cationic surfactant, and an amphoteric surfactant.

4. The method of claim 1, wherein the washing is performed for 5-30 minutes.

5. The method of claim 1, further comprising forming a coating layer on a surface of the lithium composite transition metal oxide after the washing.

6. The method of claim 5, wherein the forming of a coating layer comprises mixing the lithium composite transition metal oxide and a coating raw material and then performing heat treatment.

7. A positive electrode active material comprising a lithium composite transition metal oxide represented by Formula 1 below, wherein
    the lithium composite transition metal oxide has a powder electrical conductivity of 0.0216 S/cm to 0.05 S/cm, where the powder electrical conductivity is measured after pressing the lithium composite transition metal oxide with a force of 20 kN:

$$Li_a[Ni_bCo_cM^1_dM^2_e]O_2 \quad \text{[Formula 1]}$$

wherein, $M^1$ is one or more selected from the group consisting of Mn and Al, $M^2$ is one or more selected from the group consisting of Zr, B, W, Mg, Ce, Hf, Ta, Ti, Sr, Ba, F, P, S, and La, and $0.9 \le a \le 1.1$, $0.6 \le b < 1$, $0 < c \le 0.3$, $0 < d \le 0.3$, $0 \le e \le 0.1$.

8. The positive electrode active material of claim 7, wherein the powder electrical conductivity is 0.02S/cm or less when measured after pressing the lithium composite transition metal oxide with a force of 4 kN.

9. The positive electrode active material of claim 7, wherein the positive electrode active material contains 0.6 wt % or less of lithium by-products.

10. The positive electrode active material of claim 7, wherein the positive electrode active material comprises a coating layer including one or more elements selected from the group consisting of Al, Ti, W, B, F, P, Mg, Ni, Co, Fe, Cr, V, Cu, Ca, Zn, Zr, Nb, Mo, Sr, Sb, Bi, Si, and S.

11. A positive electrode comprising the positive electrode active material of claim 7.

12. A secondary battery comprising the positive electrode of claim 11, a negative electrode positioned opposite to the positive electrode, a separator interposed between the positive electrode and the negative electrode, and an electrolyte.

13. The positive electrode active material of claim 7, wherein the positive electrode active material contains 0.1 to 0.6 wt % of lithium by-products.

14. The positive electrode active material of claim 7, wherein the lithium composite transition metal oxide represented by Formula 1 has a modified surface, and
   wherein the modified surface is obtained by the following method comprising:
   washing the lithium composite transition metal oxide represented by Formula 1 with a cleaning liquid comprising cleaning water and a surfactant, wherein the cleaning liquid contains the cleaning water in an amount of no less than 50 parts by weight and less than 400 parts by weight based on 100 parts by weight of the lithium composite transition metal oxide.

15. The positive electrode active material of claim 14, wherein the cleaning liquid contains the surfactant in an amount of 0.01-10 parts by weight based on 100 parts by weight of the lithium composite transition metal oxide.

16. The positive electrode active material of claim 14, wherein the surfactant is one or more selected from the group consisting of an anionic surfactant, a cationic surfactant, and an amphoteric surfactant.

17. The positive electrode active material of claim 14, wherein the washing is performed for 5-30 minutes.

18. The positive electrode active material of claim 14, further comprising a coating layer disposed on the modified surface.

* * * * *